(12) United States Patent
Burov et al.

(10) Patent No.: US 9,162,917 B2
(45) Date of Patent: Oct. 20, 2015

(54) RARE-EARTH-DOPED AMPLIFYING OPTICAL FIBER

(75) Inventors: Ekaterina Burov, Boulogne-Billancourt (FR); Alain Pastouret, Massy (FR); Louis-Anne de Montmorillon, Versailles (FR); Aurelien Bergonzo, Chaville (FR)

(73) Assignee: Draka Comteq, B.V., Amsterdam (NL)

(*) Notice: Subject to any disclaimer, the term of this patent is extended or adjusted under 35 U.S.C. 154(b) by 885 days.

(21) Appl. No.: 13/410,976

(22) Filed: Mar. 2, 2012

(65) Prior Publication Data

US 2012/0224254 A1 Sep. 6, 2012

(30) Foreign Application Priority Data

Mar. 4, 2011 (EP) .................................... 11305231

(51) Int. Cl.
*H01S 3/00* (2006.01)
*C03B 37/018* (2006.01)
*C03B 37/012* (2006.01)
(Continued)

(52) U.S. Cl.
CPC ..... *C03B 37/01838* (2013.01); *C03B 37/01211* (2013.01); *C03B 37/01823* (2013.01); *C03B 37/01861* (2013.01); *C03B 37/01869* (2013.01); *G02B 6/0365* (2013.01); *C03B 2201/12* (2013.01); *C03B 2201/28* (2013.01); *C03B 2201/31* (2013.01); *C03B 2201/34* (2013.01); *C03B 2201/36* (2013.01); *C03B 2203/23* (2013.01); *H01S 3/06733* (2013.01); *H01S 3/1603* (2013.01); *H01S 3/1691* (2013.01); *H01S 3/1693* (2013.01); *H01S 3/1695* (2013.01)

(58) Field of Classification Search
CPC . G02B 6/0365; H01S 3/1695; H01S 3/06733; H01S 3/1603; H01S 3/1691; H01S 3/1693
USPC ........................................................ 359/341.1
See application file for complete search history.

(56) References Cited

U.S. PATENT DOCUMENTS

| 4,838,643 A | 6/1989 | Hodges et al. |
|---|---|---|
| 5,194,714 A | 3/1993 | Le Sergent |

(Continued)

FOREIGN PATENT DOCUMENTS

| CN | 1482476 A | 3/2004 |
|---|---|---|
| EP | 1610161 A1 | 12/2005 |

(Continued)

OTHER PUBLICATIONS

European Office Action in counterpart European Application No. 11305231.0 dated Dec. 10, 2014, pp. 1-4.

(Continued)

*Primary Examiner* — Mark Hellner
(74) *Attorney, Agent, or Firm* — Additon, Higgins & Pendleton, P.A.

(57) ABSTRACT

An amplifying optical fiber includes an inner core, an inner cladding, a depressed trench, and an outer cladding (e.g., an outer optical cladding). Typically, the inner core includes a main matrix (e.g., silica-based) doped with at least one rare earth element. The depressed trench typically has a volume integral $V_{13}$ of between about $-2200 \times 10^{-3}$ $\mu m^2$ and $-1600 \times 10^{-3}$ $\mu m^2$. Exemplary embodiments of the amplifying optical fiber are suitable for use in a compact configuration and high power applications.

19 Claims, 3 Drawing Sheets

(51) Int. Cl.
*G02B 6/036* (2006.01)
*H01S 3/067* (2006.01)
*H01S 3/16* (2006.01)

(56) References Cited

U.S. PATENT DOCUMENTS

| | | |
|---|---|---|
| 5,522,007 A | 5/1996 | Drouart et al. |
| 5,574,816 A | 11/1996 | Yang et al. |
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,154,663 B2 * | 12/2006 | Lee et al. ............... 359/334 |
| 7,162,128 B2 | 1/2007 | Lovie et al. |
| 7,221,838 B2 | 5/2007 | Jakobsen et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,440,663 B2 | 10/2008 | Matsuo et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,680,381 B1 | 3/2010 | Bookbinder et al. |
| 7,702,204 B2 | 4/2010 | Gonnet et al. |
| 7,724,998 B2 | 5/2010 | Parris et al. |
| 7,817,891 B2 | 10/2010 | Lavenne et al. |
| 7,889,960 B2 | 2/2011 | de Montmorillon et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,081,853 B2 | 12/2011 | Overton |
| 2002/0124601 A1 | 9/2002 | Bandyopadhyay et al. |
| 2003/0175003 A1 | 9/2003 | Gasca et al. |
| 2004/0052486 A1 | 3/2004 | Gaarde et al. |
| 2004/0187524 A1 | 9/2004 | Sen et al. |
| 2006/0126160 A1 * | 6/2006 | Lee et al. ............... 359/334 |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0279833 A1 | 11/2009 | Overton et al. |
| 2009/0279835 A1 | 11/2009 | de Montmorillon et al. |
| 2009/0297107 A1 | 12/2009 | Tatat |
| 2010/0021170 A1 | 1/2010 | Lumineau et al. |
| 2010/0092135 A1 | 4/2010 | Barker et al. |
| 2010/0092138 A1 | 4/2010 | Overton |
| 2010/0118388 A1 | 5/2010 | Pastouret et al. |
| 2010/0119202 A1 | 5/2010 | Overton |
| 2010/0135624 A1 | 6/2010 | Overton et al. |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0178504 A1 | 7/2010 | Chen et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0310218 A1 | 12/2010 | Molin et al. |
| 2011/0026889 A1 | 2/2011 | Risch et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2012/0009358 A1 | 1/2012 | Gharbi et al. |
| 2012/0014652 A1 | 1/2012 | Parris |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |
| 2012/0092651 A1 | 4/2012 | Molin et al. |
| 2012/0134376 A1 | 5/2012 | Burov et al. |
| 2012/0148206 A1 | 6/2012 | Boivin et al. |
| 2012/0195549 A1 | 8/2012 | Molin et al. |
| 2012/0195561 A1 | 8/2012 | Molin et al. |
| 2012/0201504 A1 | 8/2012 | Sen et al. |
| 2012/0224254 A1 | 9/2012 | Burov et al. |

FOREIGN PATENT DOCUMENTS

| | | |
|---|---|---|
| EP | 1788411 A1 | 5/2007 |
| EP | 1921478 A1 | 5/2008 |
| EP | 2194620 A1 | 6/2010 |
| EP | 2495589 A1 | 9/2012 |
| WO | 03/033423 A1 | 4/2003 |
| WO | 2009/062131 A1 | 5/2009 |
| WO | 2010/080952 A1 | 7/2010 |
| WO | 2010/109494 A2 | 9/2010 |

OTHER PUBLICATIONS

European Office Action in counterpart European Application No. 11305231.0 dated May 31, 2013, pp. 1-5.

(56) References Cited

OTHER PUBLICATIONS

European Office Action in counterpart European Application No. 11305231.0 dated Feb. 25, 2014, pp. 1-7.
European Search Report in counterpart European Application No. 11305231.0 dated Jan. 9, 2012, pp. 1-17.
Karasek, "Optimum Design of Er3+-Yb3+ Codoped Fibers for Large-Signal High-Pump-Power Applications", IEEE Journal of Quantum Electronics, Piscataway, NJ, USA, vol. 33, No. 10, Oct. 1, 1997, pp. 1699-1705.
Wang et al., "Novel Erbium Doped Fiber for High Power Applications", Proceedings of the SPIE, vol. 5623, 2005, pp. 411-417.
Matsuo et al., "Bend-Insensitive and Low-Splice-Loss Optical Fiber for Indoor Wiring in FTTH", Optical Fiber Communication Conference, 2004, vol. 2, Feb. 26, 2004, pp. 157-159.
Pastouret et al., "Nanoparticle Doping Process for Improved Fibre Amplifiers and Lasers", Proceedings of SPIE, US, vol. 7195, Jan. 26, 2009, pp. 1-8.
Office Action in counterpart European Application No. 11305231.0 dated Jul. 9, 2015, pp. 1-4.

\* cited by examiner

RARE-EARTH-DOPED AMPLIFYING OPTICAL FIBER

CROSS-REFERENCE TO PRIORITY APPLICATION

This application hereby claims the benefit of pending European Application No. 11305231.0 (filed Mar. 4, 2011, at the European Patent Office), which is hereby incorporated by reference in its entirety.

FIELD OF THE INVENTION

The present invention relates to amplifying optical fibers for amplifying optical signals that they transmit and, more specifically, to rare-earth-doped single-mode optical fibers designed for compact devices. The invention also relates to methods of manufacturing such an amplifying optical fiber.

BACKGROUND

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core $n_c$ is typically greater than the refractive index of the optical cladding $n_g$ (i.e., $n_c > n_g$).

For optical fibers, the refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding (e.g., an outer optical cladding) is shown on the y-axis. The refractive index profile is referred to as a "step" profile, "trapezoidal" profile, "parabolic" profile, or "triangular" profile for graphs having the respective shapes of a step, a trapezoid, a parabola, or a triangle. These curves are generally representative of the optical fiber's theoretical or set profile. Constraints in the manufacture of the optical fiber, however, may result in a slightly different actual profile.

Generally speaking, two main categories of optical fibers exist: multimode fibers and single-mode fibers. In a multimode optical fiber, for a given wavelength, several optical modes are propagated simultaneously along the optical fiber. In a single-mode optical fiber, the signal propagates in a fundamental LP01 mode that is guided in the optical-fiber core, while the higher order modes (e.g., the LP11 mode) are strongly attenuated.

Amplifying optical fibers (e.g., optical fibers doped with rare-earth elements) are commonly used in various optical applications.

International Publication No. WO 2010/080952 (and its counterpart U.S. Patent Publication No. 2010/0178504), each of which is hereby incorporated by reference in its entirety, disclose bend-insensitive optical fibers with a low refractive index glass ring in the cladding (i.e., a ring where the refractive index percent relative to pure silica glass is less than −0.5 percent). The design of the disclosed optical fibers, however, does not satisfactorily reduce bending losses. Additionally, International Publication No. WO 2010/080952 does not target high-power applications.

Thus, there exists a need for a rare-earth-doped amplifying optical fiber for use in a compact configuration and high power applications (e.g., around 500 mW or more).

SUMMARY

Erbium doping may be used for amplifying transmitted optical signals in long-distance optical telecommunications systems. Such optical fibers are used in erbium-doped fiber amplifiers (EDFAs) and have a central core made of a silica matrix that includes rare-earth-dopant elements (e.g., erbium) at concentrations on the order of 250 parts per million (ppm) to 1000 ppm (i.e., 0.025 weight percent to 0.1 weight percent). The rare-earth-dopant elements may be associated with complementary dopant elements to improve amplification. For example, aluminum may be used as a complementary dopant element to broaden the gain band for wavelength division multiplex (WDM) applications.

Optical amplification in a rare-earth-doped optical fiber operates by injecting a pump signal into the optical fiber, which excites the rare-earth elements (e.g., $Er^{3+}$ in an EDFA). When a light signal passes through this portion of optical fiber, it de-excites the rare-earth elements by stimulated emission, thereby producing a photon that is identical in all respects to the incident photon. The light signal is thus multiplied by two. A portion of such an optical fiber in combination with a resonant cavity constituted by a system of mirrors, or Bragg gratings, forms an optical fiber laser. The wavelength and power of the laser depend on the type and concentration of the rare earth element used.

The performance of a rare-earth-doped optical fiber is generally defined by certain parameters, namely pump power, numerical aperture (NA), power conversion efficiency (PCE), and quantum conversion efficiency (QCE). The pump power of an amplifying fiber is defined as the power of the pump, usually expressed in W or mW, launched in the optical fiber core to enable the optical amplification process. Numerical aperture (NA) is typically approximated by the following equation:

$$NA = \sqrt{n_c^2 - n_g^2},$$

where $n_c$ is the refractive index of the inner core and $n_g$ is the refractive index of the outer cladding of the optical fiber.

The power conversion efficiency (PCE) of an optical fiber is a measure of how much of the energy of the input power source (i.e., the pump) is usefully transferred to the amplifier output:

$$PCE = \frac{P_{signal\text{-}out} - P_{signal\text{-}in}}{P_{pump}},$$

where $P_{signal\text{-}out}$ is the power of the output signal, $P_{signal\text{-}in}$ is the power of the input signal and $P_{pump}$ is the pump power.

The quantum conversion efficiency (QCE) of an optical fiber is a measure of how much of the energy at the power source wavelength (i.e., the pump wavelength $\lambda_{pump}$) is usefully transferred to the amplifying wavelength $\lambda_{signal}$. QCE is a direct measure of the efficiency of an amplifier and is related to the PCE according to the following equation:

$$QCE = PCE \times \frac{\lambda_{signal}}{\lambda_{pump}}.$$

Figure 1:
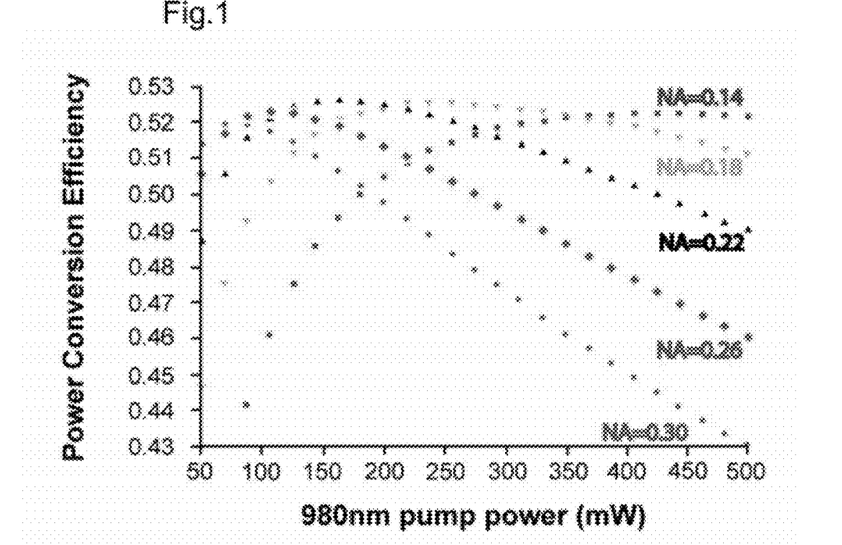
FIG. 1 graphically depicts power conversion efficiency (PCE) as a function of pump power and numerical aperture.

FIG. 1 shows the value of the PCE as a function of the value of the pump power at a wavelength of 980 nanometers (expressed in mW) for optical fibers having various numerical aperture values, namely NA=0.14, NA=0.18, NA=0.22, NA=0.26 and NA=0.30. FIG. 1 demonstrates that, for pump power values higher than or equal to 350 mW, the highest values of PCE are obtained for the lowest values of the numerical aperture.

To further reduce the size of fiber amplifiers, the packaging size of optical components can be reduced. Such size reductions also reduce the volume allocated to the gain medium (i.e., the rare-earth-doped optical fiber).

An efficient way to reduce the volume is to reduce the storage radius of the amplifying fiber (i.e., the radius of curvature of the optical fiber when it is bent for packaging or installation).

Figure 2:
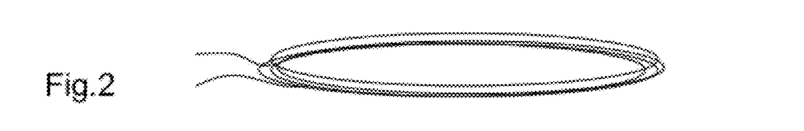
FIG. 2 schematically depicts the design of a compact EDFA.

As shown in FIG. 2, the typical optical fiber storage radius used in commercial compact amplifiers is 20 millimeters or less.

Nevertheless, according to the rare-earth-doped optical fiber design, in particular its single-mode propagation conditions (i.e., mode field diameter, cut-off wavelength, numerical aperture) specified to address the optical fiber application field, this reduction in the radius of curvature can induce an increase in the optical fiber's macrobending losses (hereafter referred to as bending losses).

Table 1 (below) shows the theoretical impact of the numerical aperture on optical-fiber bending losses for different storage (curvature) radii. The optical fiber core radii are calculated to have single-mode propagation at a wavelength of 1550 nanometers.

TABLE 1

| NA | | 0.10 | 0.12 | 0.13 | 0.14 | 0.15 | 0.16 | 0.17 | 0.18 |
|---|---|---|---|---|---|---|---|---|---|
| $\Delta n_1 \times 10^3$ | | | 3.5 | 5.1 | 5.8 | 6.7 | 7.7 | 8.8 | 9.9 | 11.1 |
| $r_1$ (µm) | | | 4.38 | 3.68 | 3.41 | 3.16 | 2.95 | 2.77 | 2.61 | 2.46 |
| bending losses | R = 10 mm | 2550 | 343 | 106 | 27.0 | 4.72 | 0.5 | 0.06 | 0.005 |
| (dB/m) | R = 20 mm | 100 | 1.65 | 0.15 | 0.009 | 0.0003 | 0.0 | 0.0 | 0.0 |
| | R = 30 mm | 4.56 | 0.009 | 0.0002 | 0.0 | 0.0 | 0.0 | 0.0 | 0.0 |

In Table 1, $\Delta n_1$ is the refractive index difference of the inner core of the optical fiber with respect to the outer cladding of the optical fiber. Moreover, $r_1$ is the outer radius of the optical fiber's inner core, and R is the storage radius of the optical fiber.

The bending losses are calculated at a wavelength of 1550 nanometers and the optical-fiber cut-off wavelength is 1134 nanometers.

For numerical aperture lower than 0.18, the bending losses of the rare-earth-doped optical fiber become non-negligible for a compact configuration (R<20 millimeters).

In this regard, there seems to be a limit in achievable bending-loss reduction in the case of high pump power utilization as, in this case, the value of the numerical aperture in a compact amplifier configuration has to be reduced.

Indeed, for amplifiers operating at relatively low pump power (e.g., around 250 mW) the induced bending losses can be neglected even at low optical fiber storage radius. In this case, the related optical fibers generally exhibit a high numerical aperture, typically NA>0.22.

However, the induced bending losses are not negligible for amplifiers operating at higher pump power (e.g., around 500 mW or higher).

Thus, amplifiers operating at such higher pump powers and optical fibers with lower numerical apertures (e.g., NA<0.18) that ensure optimal power conversion have yet to be achieved.

One method of decreasing the numerical aperture includes decreasing the refractive index of the optical fiber's inner core. Consequently, the optical fiber's bending losses will increase, as shown in the examples given in Table 1. The efficiency of the complete assembly or subassembly will thus be reduced.

Therefore, reducing induced bending losses is important for amplifying fibers operating at high pump power in a compact configuration.

Two main techniques may be used for reducing the overall bending losses (i.e., along the whole length of the optical fiber). First, the length of optical fiber required for a given amplification gain may be reduced by increasing the inner core doping (e.g., the rare earth content). Increased core doping, however, may lead to a decrease in amplifying efficiency due to a so-called concentration quenching phenomenon. Namely, when the local concentration of rare earth ions becomes high enough, the average distance between two rare earth ions may decrease, potentially giving rise to the formation of rare earth ion pairs. In such a case, it is no longer valid to assume that each ion is an isolated ion that acts independently of its neighbors, and energy transfers between ions are possible. This undesirable effect reduces the energy available for amplification and consequently reduces the amplifier efficiency.

Moreover, the bending loss reduction resulting from optical fiber length reduction remains rather limited. Furthermore, this length reduction technique typically cannot achieve low numerical-aperture rare-earth-doped optical fibers desired for high pump power conditions.

A second technique includes using core rods instead of optical fibers to avoid any bending. Using core rods, however, precludes the achievement of an integrated system using only optical fibers. Thus, this technique is not considered a viable industrial solution.

Accordingly, in one aspect, the present invention embraces an amplifying optical fiber for use in a compact configuration and high power applications (e.g., around 500 mW or more). In particular, exemplary optical fibers achieve reduced bending loss at low storage radii while maintaining high amplifying efficiency. Typically, the optical fiber includes an inner core (i.e., a central core), an inner cladding, a depressed trench, and an outer cladding (e.g., an outer optical cladding). The inner cladding is typically positioned between the inner core and the outer cladding (e.g., immediately surrounding the inner core). The depressed trench is typically positioned between the inner cladding and the outer cladding (e.g., immediately surrounding the inner cladding).

The inner core has an outer radius $r_1$ and a refractive index difference $\Delta n_1$ with respect to the outer cladding. The inner core typically includes a main matrix (e.g., silica-based) doped with at least one rare earth element. Typically, the inner core's outer radius $r_1$ is between about 2.5 microns and 3.1 microns. The inner core's refractive index difference $\Delta n_1$ is typically between about $8.0 \times 10^{-3}$ and $10.5 \times 10^{-3}$.

The inner cladding has an outer radius $r_2$ and a refractive index difference $\Delta n_2$ with respect to the outer cladding. Typically, the inner cladding's outer radius $r_2$ is between about 4.1 microns and 15.8 microns. The difference between the inner cladding's outer radius $r_2$ and the inner core's outer radius $r_1$ (i.e., $r_2 - r_1$) is typically between about 1.4 microns and 12.9 microns.

The depressed trench has an outer radius $r_3$ and a negative refractive index difference $\Delta n_3$ with respect to the outer cladding. Typically, the depressed trench's refractive index difference $\Delta n_3$ is between about $-14.2\times10^{-3}$ and $-3.7\times10^{-3}$. The difference between the depressed trench's outer radius $r_3$ and the inner cladding's outer radius $r_2$ (i.e., $r_3-r_2$) is typically between about 4.7 microns and 18.9 microns. Typically, the depressed trench's volume integral $V_{13}$, defined as $$V_{13} = 2 \cdot \int_{r_2}^{r_3} \Delta n(r) \cdot r \, dr \approx (r_3^2 - r_2^2) \times \Delta n_3,$$

is between about $-2200\times10^{-3}$ $\mu m^2$ and $-1600\times10^{-3}$ $\mu m^2$.

In an exemplary embodiment, the optical fiber has a numerical aperture of between about 0.16 and 0.18 (e.g., between about 0.16 and 0.17).

In another exemplary embodiment, at a wavelength of 1550 nanometers, the optical fiber has a Mode Field Diameter (MFD) of about 8.0 microns or less.

In yet another exemplary embodiment, for a radius of curvature of 5 millimeters at a wavelength of 1550 nanometers, the optical fiber has bending losses of less than 0.01 dB/m.

In yet another exemplary embodiment, the optical fiber has an inner core doped by an element (e.g., fluorine) that reduces the refractive index of silica.

In yet another exemplary embodiment, the optical fiber's inner core includes nanoparticles containing at least one rare earth element.

In yet another exemplary embodiment, the optical fiber's inner core includes at least one rare earth element from chloride salt precursors.

In yet another exemplary embodiment, the optical fiber's inner core includes erbium, ytterbium, and/or thulium.

In yet another exemplary embodiment, the concentration of rare earth elements in the optical fiber's inner core is between about 0.01 weight percent and 0.5 weight percent (e.g., between about 0.01 weight percent and 0.2 weight percent).

In yet another exemplary embodiment, the optical fiber's inner core includes germanium, phosphorus, and/or aluminum.

In yet another exemplary embodiment, the inner cladding's refractive index difference $\Delta n_2$ is between about $-1.0\times10^{-3}$ and $1\times10^{-3}$ (e.g., between $-0.5\times10^{-3}$ and $0.5\times10^{-3}$).

In yet another exemplary embodiment, the inner cladding's refractive index difference $\Delta n_2$ is substantially zero.

In yet another exemplary embodiment, the optical fiber's cut-off wavelength is less than 1500 nanometers.

In another aspect, the present invention embraces an optical fiber laser that includes a portion of the amplifying optical fiber. In exemplary embodiments, the optical fiber laser has a pump power greater than 500 mW.

In yet another aspect, the present invention embraces a method of manufacturing a rare-earth-doped amplifying optical fiber.

In an exemplary embodiment, the method includes making a preform tube, so as to obtain an inner cladding, a depressed trench, and an outer cladding having a desired refractive index profile. The preform tube is then doped by forming a doped inner core in the preform tube. The method typically includes collapsing the preform tube into a preform rod. The preform rod may be overcladded or sleeved to make a preform. The method includes drawing the preform into an optical fiber.

In another exemplary embodiment, the method includes making a first doped preform rod including at least a doped inner core having a desired refractive index profile. The first doped preform rod is made by making a first preform tube starting from an external tube and doping the first preform tube to form a doped inner core in the first preform tube. The first preform tube is collapsed into the first doped preform rod and the external tube is eliminated. The method also includes separately making a second preform tube to obtain an inner cladding, a depressed trench, and an outer cladding having a desired refractive index profile. The second preform tube is assembled around the first doped preform rod, and the second preform tube is fused onto the first doped preform rod to obtain a second doped preform rod. The second doped preform rod may be overcladded or sleeved to make a preform. The method includes drawing the preform into an optical fiber.

In yet another exemplary embodiment, the method includes fusing the second preform tube onto the first doped preform rod at a temperature above 2000° C.

In yet another exemplary embodiment, the method includes doping a preform tube using a Modified Chemical Vapor Deposition (MCVD) process.

In yet another exemplary embodiment, the method includes making a first doped preform rod using a Modified Chemical Vapor Deposition (MCVD) process.

In yet another exemplary embodiment including an MCVD process, the MCVD process includes depositing at least one first core glass layer on the inner surface of the preform tube and depositing a glass layer on the inner surface of the at least one first core glass layer, at a sub-sintering temperature to obtain a porous core layer. The MCVD process further includes adding nanoparticles to the porous core layer to obtain a doped porous core layer and calcinating the doped porous core layer to strengthen nanoparticle structure (e.g., up to 1200° C. for at least one hour).

In yet another exemplary embodiment, the method includes doping the preform tube using a Plasma Chemical Vapor Deposition (PCVD) process.

In yet another exemplary embodiment, the method includes making a second preform tube using a Plasma Chemical Vapor Deposition (PCVD) process.

The foregoing illustrative summary, as well as other exemplary objectives and/or advantages of the invention, and the manner in which the same are accomplished, are further explained within the following detailed description and its accompanying drawings.

DETAILED DESCRIPTION

Exemplary rare-earth-doped optical fibers in accordance with the present invention have reduced sensitivity to bending losses and, in some embodiments, have low numerical apertures (e.g., NA between 0.16 and 0.18).

In exemplary embodiments, rare earth elements are incorporated into the optical fiber's core (e.g., inner core or central core) from commercial precursors such as chloride salts, and a low numerical aperture is realized by the incorporation of, within the matrix of the inner core of the optical fiber, an element reducing the refractive index of the inner core. In other words, the main matrix surrounds the rare earth elements (i.e., the rare earth elements are dispersed or otherwise embedded within the main matrix).

Exemplary optical fibers include rare earth elements that are incorporated from nanoparticle (NP) doping, thereby facilitating the management of the optical fiber's amplification performance independently from the other elements (e.g., the main matrix) of the inner core. The matrix of the inner core is doped by incorporating nanoparticles containing rare earth elements. In other words, the main matrix surrounds the nanoparticles (i.e., the NPs are dispersed or otherwise embedded within the main matrix).

The low numerical aperture is realized by adjusting the composition of the main core matrix. For example, the low numerical aperture may be achieved by using (i) a dopant that increases the refractive index, such as germanium and/or phosphorus and/or (ii) a dopant that decreases the refractive index, such as fluorine and/or boron.

The reduction of the sensitivity to the bending losses may be achieved by including, at a suitable distance from the inner core, a depressed trench in the optical fiber's cladding. Moreover, the trench has an appropriate width and depth. Indeed, these trench parameters, which are detailed herein, facilitate the achievement of low bending losses with a negligible impact on the numerical aperture.

The optical fiber according to the present invention is a rare-earth-doped amplifying single-mode fiber. The optical fiber includes an inner core (e.g., a central core), an inner cladding surrounding the inner core (e.g., immediately surrounding the inner core), a depressed trench surrounding the inner cladding (e.g., immediately surrounding the inner cladding), and an outer cladding (e.g., immediately surrounding the outer cladding).

The inner core (e.g., the central core) includes a silica-based main matrix doped with at least one rare earth element. The inner core has an outer radius $r_1$ and a refractive index difference $\Delta n_1$ with respect to the outer cladding (e.g., the outer optical cladding). The radius $r_1$ is the radial distance from the center of the optical fiber to the outer periphery of the inner core.

The inner cladding has an outer radius $r_2$ and a refractive index difference $\Delta n_2$ with respect to the outer cladding. The radius $r_2$ is the radial distance from the center of the optical fiber to the outer periphery of the inner cladding.

The depressed trench has an outer radius $r_3$ and a negative refractive index difference $\Delta n_3$ with respect to the outer cladding. The radius $r_3$ is the radial distance from the center of the optical fiber to the outer periphery of the depressed trench.

The volume integral of the depressed trench $V_{13}$ is defined as:

$$V_{13} = 2 \cdot \int_{r_2}^{r_3} \Delta n(r) \cdot r\, dr \approx (r_3^2 - r_2^2) \times \Delta n_3.$$

Tables 2A and 2B (below) provide the characteristics and performance parameters of 17 prophetic exemplary optical fibers in accordance with the present invention. The notations used in Tables 2A and 2B are as follows:

$r_1$ is the radius of the inner core;

$r_2$ is the radius of the inner cladding;

$r_3$ is the radius of the depressed trench;

$\Delta n_1$ is the refractive index difference between the inner core and the outer cladding;

$\Delta n_2$ is the refractive index difference between the inner cladding and the outer cladding;

$\Delta n_3$ is the refractive index difference between the depressed trench and the outer cladding;

$V_{13}$ is the volume integral of the depressed trench;

NA is the numerical aperture;

MFD is the mode field diameter at a wavelength of 1550 nanometers;

BL refers to macrobending losses at a wavelength of 1550 nanometers;

R is the radius of curvature of the bent optical fiber during the macrobending loss measurement;

LP01 is the fundamental mode;

LP11 is the more robust higher order mode; and the LP11 leakage losses are the losses when the optical fiber is submitted to straight conditions.

At 1550 nanometers, the fundamental mode LP01 is propagating so that the leakage losses of the optical fiber are zero, but the more robust higher order mode LP11 undergoes leakage losses. When these leakage losses are higher than 19.34 dB, it is considered that the higher order mode is cut. This is the case for all exemplary optical fibers in Tables 2A and 2B after a 10-meter-long transmission at 1550 nanometers. In other words, exemplary optical fibers 1-17 are each single mode at 1550 nanometers after a 10-meter-long transmission.

TABLE 2A

|  | $r_1$ (µm) | $r_2$ (µm) | $r_3$ (µm) | $r_2 - r_1$ (µm) | $r_3 - r_2$ (µm) | $\Delta n_1$ x1000 | $\Delta n_2$ x1000 | $\Delta n_3$ x1000 | $V_{13}$ (µm$^2$) x1000 |
|---|---|---|---|---|---|---|---|---|---|
| Ex. 1 | 2.80 | 8.00 | 18.00 | 5.2 | 10 | 8.80 | 0.00 | −7.00 | −1820 |
| Ex. 2 | 2.80 | 10.04 | 19.47 | 7.24 | 9.43 | 8.80 | 0.00 | −7.00 | −1949 |
| Ex. 3 | 2.80 | 5.89 | 18.52 | 3.09 | 12.63 | 8.80 | 0.00 | −7.00 | −2157 |
| Ex. 4 | 2.80 | 6.24 | 16.73 | 3.44 | 10.49 | 8.80 | 0.00 | −7.00 | −1687 |
| Ex. 5 | 2.80 | 4.81 | 16.43 | 2.01 | 11.62 | 8.80 | 0.00 | −7.00 | −1728 |
| Ex. 6 | 2.80 | 4.57 | 18.06 | 1.77 | 13.49 | 8.80 | 0.00 | −7.00 | −2137 |
| Ex. 7 | 2.57 | 8.24 | 14.85 | 5.67 | 6.61 | 9.82 | 0.85 | −11.85 | −1807 |
| Ex. 8 | 2.86 | 15.75 | 20.48 | 12.89 | 4.73 | 9.11 | −0.93 | −11.87 | −2035 |
| Ex. 9 | 3.08 | 10.85 | 22.27 | 7.77 | 11.42 | 9.42 | −0.95 | −4.54 | −1717 |
| Ex. 10 | 2.76 | 4.14 | 16.66 | 1.38 | 12.52 | 9.70 | 0.21 | −8.33 | −2169 |
| Ex. 11 | 2.76 | 15.58 | 24.20 | 12.82 | 8.62 | 9.68 | −0.66 | −5.72 | −1961 |
| Ex. 12 | 2.76 | 4.67 | 12.01 | 1.91 | 7.34 | 9.77 | −0.73 | −13.39 | −1637 |
| Ex. 13 | 3.01 | 8.24 | 16.83 | 5.23 | 8.59 | 8.56 | −0.57 | −8.90 | −1915 |

TABLE 2A-continued

|  | $r_1$ (μm) | $r_2$ (μm) | $r_3$ (μm) | $r_2 - r_1$ (μm) | $r_3 - r_2$ (μm) | $\Delta n_1$ x1000 | $\Delta n_2$ x1000 | $\Delta n_3$ x1000 | $V_{13}$ (μm$^2$) x1000 |
|---|---|---|---|---|---|---|---|---|---|
| Ex. 14 | 2.63 | 7.18 | 14.00 | 4.55 | 6.82 | 8.98 | 0.28 | −14.17 | −2048 |
| Ex. 15 | 2.77 | 4.35 | 13.51 | 1.58 | 9.16 | 8.81 | 0.93 | −13.34 | −2182 |
| Ex. 16 | 2.90 | 5.30 | 24.18 | 2.4 | 18.88 | 8.79 | −0.45 | −3.74 | −2081 |
| Ex. 17 | 2.74 | 6.66 | 19.15 | 3.92 | 12.49 | 9.89 | 0.35 | −6.03 | −1945 |

TABLE 2B (Given at the 1550 nm wavelength)

|  | NA | MFD (μm) | LP01 R = 15 mm BL (dB/m) | LP01 R = 10 mm BL (dB/m) | LP01 R = 7.5 mm BL (dB/m) | LP01 R = 5 mm BL (dB/m) | LP11 leakage losses (dB/m) |
|---|---|---|---|---|---|---|---|
| Ex. 1 | 0.16 | 7.62 | $1 \times 10^{-7}$ | $6 \times 10^{-5}$ | $8 \times 10^{-4}$ | $7 \times 10^{-3}$ | 3.4 |
| Ex. 2 | 0.16 | 7.73 | $1 \times 10^{-7}$ | $6 \times 10^{-5}$ | $7 \times 10^{-4}$ | $7 \times 10^{-3}$ | 2.0 |
| Ex. 3 | 0.16 | 7.27 | $6 \times 10^{-8}$ | $2 \times 10^{-5}$ | $2 \times 10^{-4}$ | $1 \times 10^{-3}$ | 2.2 |
| Ex. 4 | 0.16 | 7.35 | $2 \times 10^{-7}$ | $7 \times 10^{-5}$ | $1 \times 10^{-3}$ | $9 \times 10^{-3}$ | 8.5 |
| Ex. 5 | 0.16 | 6.93 | $6 \times 10^{-7}$ | $1 \times 10^{-4}$ | $1 \times 10^{-3}$ | $7 \times 10^{-3}$ | 21 |
| Ex. 6 | 0.16 | 6.84 | $3 \times 10^{-7}$ | $3 \times 10^{-5}$ | $3 \times 10^{-4}$ | $2 \times 10^{-3}$ | 9.0 |
| Ex. 7 | 0.17 | 7.53 | $3 \times 10^{-9}$ | $8 \times 10^{-6}$ | $4 \times 10^{-4}$ | $9 \times 10^{-3}$ | 3.7 |
| Ex. 8 | 0.16 | 7.30 | $9 \times 10^{-8}$ | $4 \times 10^{-5}$ | $5 \times 10^{-4}$ | $6 \times 10^{-3}$ | 8.8 |
| Ex. 9 | 0.17 | 7.28 | $5 \times 10^{-10}$ | $7 \times 10^{-7}$ | $4 \times 10^{-5}$ | $1 \times 10^{-3}$ | 4.9 |
| Ex. 10 | 0.17 | 6.43 | $7 \times 10^{-9}$ | $4 \times 10^{-6}$ | $7 \times 10^{-5}$ | $7 \times 10^{-4}$ | 6.6 |
| Ex. 11 | 0.17 | 7.18 | $1 \times 10^{-8}$ | $9 \times 10^{-6}$ | $2 \times 10^{-4}$ | $3 \times 10^{-3}$ | 4.7 |
| Ex. 12 | 0.17 | 6.37 | $4 \times 10^{-8}$ | $3 \times 10^{-5}$ | $6 \times 10^{-4}$ | $9 \times 10^{-3}$ | 14 |
| Ex. 13 | 0.16 | 7.55 | $4 \times 10^{-8}$ | $2 \times 10^{-5}$ | $4 \times 10^{-4}$ | $5 \times 10^{-3}$ | 2.4 |
| Ex. 14 | 0.16 | 7.44 | $3 \times 10^{-7}$ | $9 \times 10^{-5}$ | $1 \times 10^{-3}$ | $9 \times 10^{-3}$ | 2.4 |
| Ex. 15 | 0.16 | 6.49 | $6 \times 10^{-7}$ | $6 \times 10^{-5}$ | $5 \times 10^{-4}$ | $3 \times 10^{-3}$ | 2.4 |
| Ex. 16 | 0.16 | 7.24 | $4 \times 10^{-8}$ | $1 \times 10^{-5}$ | $1 \times 10^{-4}$ | $1 \times 10^{-3}$ | 43 |
| Ex. 17 | 0.17 | 7.22 | $3 \times 10^{-10}$ | $5 \times 10^{-7}$ | $3 \times 10^{-5}$ | $8 \times 10^{-4}$ | 2.0 |

Each of the exemplary optical fibers in Tables 2A and 2B exhibit (i) a numerical aperture (NA) of between 0.16 and 0.17, (ii) at a wavelength of 1550 nanometers, a Mode Field Diameter (MFD) of less than or equal to 8.0 microns, and (iii) for a radius of curvature of 5 millimeters at a wavelength of 1550 nanometers, bending losses of less than 0.01 dB/m. Some of the exemplary optical fibers exhibit a Mode Field Diameter (MFD) of between about 6.4 microns and 7.8 microns (e.g., between about 6.37 microns and 7.73 microns).

The exemplary optical fibers of Tables 2A and 2B have the following characteristics: $r_1$ is between 2.5 microns and 3.1 microns; $r_2$ is between 4.1 microns and 15.8 microns; $r_2-r_1$ is between 1.4 microns and 12.9 microns; $r_3-r_2$ is between 4.7 microns and 18.9 microns; $\Delta n_1$ is between $8.0 \times 10^{-3}$ and $10.5 \times 10^{-3}$ (e.g., between $8.56 \times 10^{-3}$ and $9.89 \times 10^{-3}$); and $\Delta n_3$ is between $-14.2 \times 10^{-3}$ and $-3.7 \times 10^{-3}$.

Additionally, the exemplary optical fibers include a depressed trench having volume integral $V_{13}$ of between $-2200 \times 10^{-3}$ μm$^2$ and $-1600 \times 10^{-3}$ μm$^2$.

Moreover, in the exemplary optical fibers, $\Delta n_2$ is between $-1.0 \times 10^{-3}$ and $1.0 \times 10^{-3}$ (e.g., between $-0.5 \times 10^{-3}$ and $0.5 \times 10^{-3}$), and, in particular exemplary optical fibers, $\Delta n_2$ is substantially equal to zero.

Furthermore, each exemplary optical fiber has a cut-off wavelength below 1500 nanometers.

In exemplary embodiments in accordance with the present invention, within the optical fiber's inner core, the concentration of rare earth elements is between 0.01 weight percent and 0.5 weight percent (e.g., between 0.01 weight percent and 0.2 weight percent).

Figure 3:
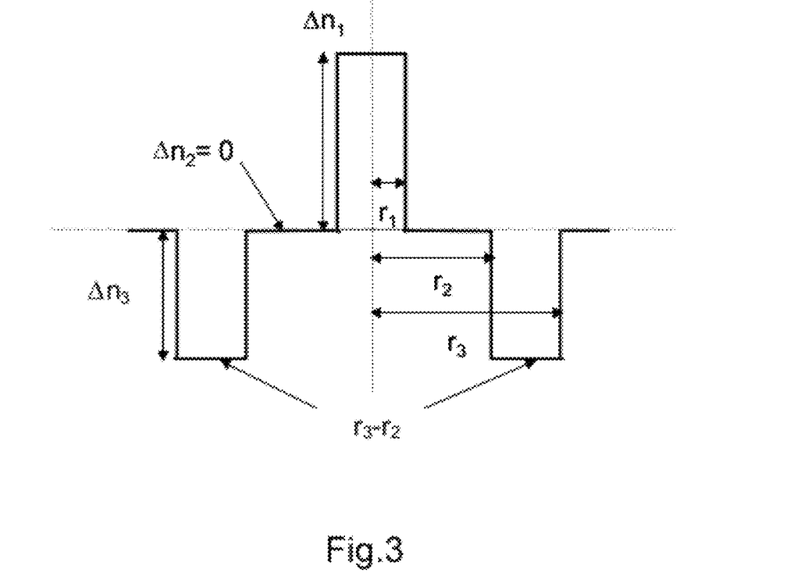
FIG. 3 schematically depicts the refractive index profile of an exemplary optical fiber according to the present invention.

FIG. 3 schematically depicts the refractive index profile of an exemplary optical fiber according to the present invention.

In the optical fiber according to the invention, the inner core is rare earth doped. For example, erbium may be used as a rare earth doping element. Alternatively, ytterbium, thulium, or combinations of erbium, ytterbium, and/or thulium may be used.

In exemplary embodiments, the main core matrix includes dopants that reduce the refractive index of the inner core. The rare earth elements are incorporated from commercial precursors such as chlorides. The low numerical aperture is realized by the incorporation, within the matrix of the optical fiber's inner core, of an element reducing the refractive index of the inner core.

In exemplary embodiments, the doping element reducing the refractive index of the inner core is fluorine. To obtain a refractive index profile in accordance with this particular embodiment of the invention, the fluorine concentration may be between about 0 and 5 weight percent (e.g., between about 1 and 4 weight percent).

As used herein, the weight percentage of fluorine (denoted weight % F) is defined as follows:

$$\text{weight } \% \ F = \frac{w_F}{w_{doped\ glass}} \times 100$$

where $w_F$ is the total weight of fluorine in the inner core and $w_{dopedglass}$ is the total weight of the doped glass (i.e., doped silica within the inner core).

In another exemplary embodiment, the rare earth elements are incorporated from nanoparticle (NP) doping. This facilitates the management of the optical fiber's amplification performance independently from the other elements (e.g., the main matrix) of the inner core. The low numerical aperture is realized by adjusting the composition of the main core matrix.

In yet another exemplary embodiment, the core includes a dopant that increases the refractive index, such as germanium, phosphorus, and/or a dopant that decreases the refractive index, such as fluorine.

FIG. 3 corresponds to an exemplary embodiment in which the inner core is doped with erbium. FIG. 3 illustrates the refractive index profile of all the exemplary optical fibers of Tables 2A and 2B.

As depicted in FIG. 3, the inner core has a step-shaped refractive index profile, the end of which is located at a distance $r_1$ from the center of the optical fiber. The inner core is surrounded by an inner cladding having a refractive index difference of zero with respect to the outer cladding (e.g., the outer optical cladding). The depressed trench surrounds the inner cladding and has a negative refractive index difference with respect to the outer cladding.

The invention also relates to an optical fiber laser including at least a portion of an optical fiber according to embodiments of the present invention.

The invention further relates to an optical amplifier including at least a portion of an optical fiber according to embodiments of the present invention and having a pump power of around 500 mW or more.

Exemplary embodiments according to the present invention improve the performance of amplifying fibers (e.g., EDFAs) and facilitates the design of compact amplifiers functioning at high pump power (i.e., around 500 mW or more).

In addition, exemplary embodiments according to the present invention make it possible to minimize the bending loss sensitivity of an optical fiber independently from the amplifying medium and the guiding mode characteristics.

Furthermore, exemplary embodiments according to the present invention make it possible to reduce the energy transfer between neighboring optical fiber loops, which usually induces signal perturbations and penalties.

The refractive index profile of exemplary optical fibers according to the present invention can be obtained using a manufacturing method in accordance with another aspect of the present invention. Two illustrative, exemplary embodiments of the method will be described.

In brief, the first exemplary embodiment includes successive PCVD (Plasma Chemical Vapor Deposition) and MCVD (Modified Chemical Vapor Deposition) steps, whereas the second embodiment includes parallel steps of PCVD and MCVD followed by an assembling step.

Figure 4:
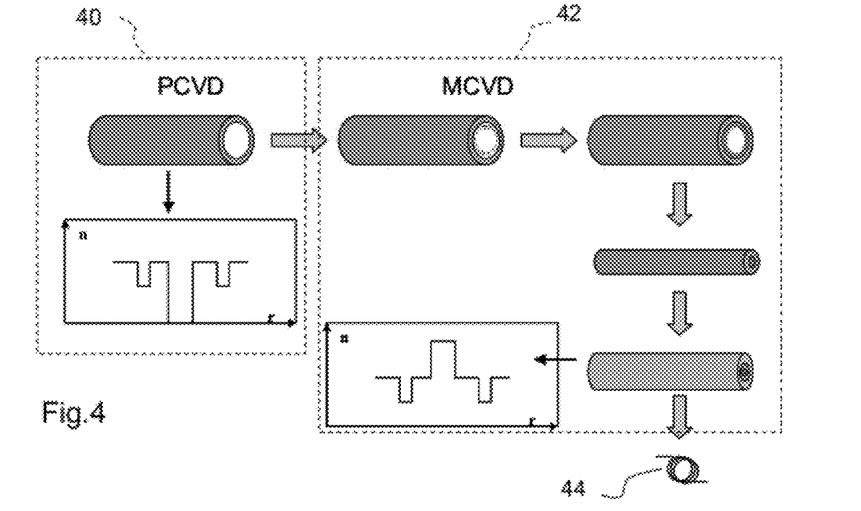
FIG. 4 schematically depicts an exemplary embodiment of a method of manufacturing an optical fiber in accordance with the present invention.

The first exemplary embodiment will be described with reference to FIG. 4. A first step 40 includes realizing the refractive index profile of the inner cladding, depressed trench, and outer cladding of an optical preform to be manufactured, using, for example, a Plasma Chemical Vapor Deposition (PCVD) process according to a controlled gas delivery program. It ensures the cladding refractive index profile of the preform. The controlled gas delivery program makes it possible to incorporate gaseous glass forming precursors such as $SiCl_4$, $GeCl_4$, and $C_2F_6$ according to specified compositions.

In this step 40, successive glass layers are deposited on the inner surface (i.e., the interior surface) of a glass tube at a temperature above 1700° C. The composition of the glass layers is determined according to the targeted refractive index profile, as follows.

The first layers are made of silica ($SiO_2$) and will determine the reference level of the refractive index profile (i.e., the outer cladding or outer optical cladding). The first layers may also be doped with germanium in the form of $GeO_2$. This will increase the reference level of the preform refractive index. For example, 1 weight percent of germanium will increase the refractive index by about $1 \times 10^{-3}$.

The depressed trench deposition is achieved at specified preform radial positions by incorporating defined quantities of fluorine. This will decrease the refractive index. For example, 1 weight percent of fluorine will decrease the refractive index by about $3.5 \times 10^{-3}$. To achieve a refractive index difference $\Delta n_3$ of at least $-7.00 \times 10^{-3}$, as in exemplary optical fiber 1 in Tables 2A and 2B, about 2.5 weight percent of fluorine should be incorporated.

In step 40, the last layers of the cladding (e.g., the inner cladding layers) are made in the same or similar conditions as the first layers.

The use of a PCVD process is advantageous, because it enables incorporating high fluorine content and creating a specific and highly reproducible index profile over a wide fiber radius.

Next, step 42 includes making a doped preform by forming a doped inner core in the preform tube obtained at the end of step 40.

Step 42 may be carried out using a Modified Chemical Vapor Deposition (MCVD) process for doped core deposition according to a controlled gas delivery program. As in step 40, this makes it possible to incorporate gaseous glass-forming precursors, such as $SiCl_4$, $GeCl_4$, and $C_2F_6$ according to specified compositions.

Successive core glass layers are deposited on the inner surface of the preform tube. As in step 40, the composition of the layers is determined according to the targeted refractive index profile, as follows.

For example, the first core layers are deposited at a temperature above 1700° C. and are made of silica doped with $GeO_2$. To achieve a refractive index difference $\Delta n_1$ of $8.80 \times 10^{-3}$ as in the exemplary optical fiber 1 in Tables 2A and 2B, about 9 weight percent of germanium should be incorporated.

A glass layer having the same composition as the first core layers is then deposited, at a sub-sintering temperature (e.g., around 1450° C.) to obtain a porous core layer.

The porous layer is then impregnated at room temperature with an aqueous suspension containing nanoparticles co-doped with alumina ($Al_2O_3$) and erbium (Er). The Al/Er atomic ratio within the nanoparticles, that is to say the number of atoms of aluminum with respect to the number of atoms of erbium in the nanoparticles, is adjusted to obtain the desired erbium chemical environment, ensuring the expected gain shape of the optical fiber. To obtain a WDM gain shape in the C-band (1525-1570 nanometers), nanoparticles having an Al/Er ratio on the order of 200 are incorporated.

The nanoparticles may be manufactured in the frame of a stable aqueous suspension using soft chemistry at room temperature through co-precipitation of erbium and aluminum salts at a controlled pH. For example, the Er concentration in the doping solution may be 0.002 mole/l and the Al concentration may be 0.4 mole/l.

Exemplary nanoparticle manufacturing methods are described in the following commonly-assigned publications and patent application, each of which is hereby incorporated by reference in its entirety: U.S. Patent Application Publication No. 2003/0175003; U.S. Patent Application Publication No. 2010/0118388; U.S. Patent Application Publication No. 2010/0135627; U.S. Patent Application Publication No. 2010/0142033; U.S. Patent Application Publication No. 2010/0214649; U.S. Patent Application Publication No. 2011/0116160; U.S. patent application Ser. No. 13/315,712 for a Rare-Earth-Doped Optical Fiber, filed Dec. 9, 2011 (Boivin et al.).

The impregnation solution is removed from the porous layer after a certain period of time (e.g., about 10 hours) and the resulting doped porous layer is dried at room temperature under argon flux.

In exemplary embodiments, the doped porous layer is then calcined at a temperature of up to 1200° C. for at least 1 hour. This sub-step is particularly advantageous, because it strengthens the nanoparticle structure before the collapsing step. This calcination step makes it possible to keep the nanoparticle structure in the preform after collapsing.

The doped porous layer is then sintered at a temperature above 1700° C.

Next, the preform is collapsed at 2200° C. to obtain the primary doped preform in the form of a preform rod.

The preform rod is then optionally overcladded or sleeved into a preform by adding external silica tubes or silica layers to adjust the core/clad thickness ratio and ensure single-mode propagation of transmitted signals.

At step 44, the optionally sleeved or overcladded doped preform is drawn into an optical fiber. In exemplary embodiments, at a wavelength of 1530 nanometers, the drawn optical fiber exhibits erbium attenuation of about 7 dB/m. Erbium attenuation corresponds to the absorption of light due to the presence of erbium ions in the optical fiber core. This absorption depends on the light wavelength. The drawn optical fiber may also exhibit a numerical aperture (NA) of 0.16. For a radius of curvature of 10 millimeters at a wavelength of 1550 nanometers, the drawn optical fiber may exhibit bending losses of $5.6 \times 10^{-5}$ dB/m. Furthermore, the drawn optical fiber may exhibit a gain over the C-Band of 25 dBm at a pump power of 1000 mW.

The second exemplary embodiment of the method of manufacturing an optical fiber according to the present invention will be described with reference to FIG. 5. According to the second embodiment, a doped core rod (e.g., made by using MCVD (Modified Chemical Vapor Deposition)), is assembled within a cladding profile that is made separately, (e.g., using PCVD (Plasma Chemical Vapor Deposition)).

To avoid easy breaking of the assembly, the PCVD cladding layers may not be directly assembled with the MCVD doped core rod. Therefore, the PCVD cladding layers are assembled with MCVD cladding layers having the same composition. As a result, the MCVD core rod used in the second exemplary embodiment has some cladding layers on its external surface.

According to this second exemplary embodiment, the same optical fiber as in the first exemplary embodiment can be manufactured through the following steps.

A first step 50 includes manufacturing a doped core rod with the same core refractive index profile as in the first embodiment but with the above-mentioned cladding part. It may be made using an MCVD process.

A cladding part is formed by successive deposition of glass layers at a temperature above 1700° C. within the interior (e.g., on the interior surface) of an external glass tube. The composition of these glass layers is determined according to the targeted refractive index profile. For example, several layers made of silica ($SiO_2$) are deposited. Additionally, the layers may be doped with germanium in the form of $GeO_2$. As explained with respect to the first exemplary embodiment, germanium doping will increase the refractive index.

Next, successive core glass layers are deposited within the interior (e.g., on the deposited cladding) of the external glass tube. The composition of these layers is determined according to the targeted refractive index profile, as in the first exemplary embodiment.

The first core layers are deposited at a temperature above 1700° C. and are made of silica doped with $GeO_2$. To achieve a refractive index difference $\Delta n_1$ of $8.80 \times 10^{-3}$ as in exemplary optical fiber 1 in Tables 2A and 2B about 9 weight percent of germanium should be incorporated.

A glass layer having the same composition as the first core layers is then deposited, at a sub-sintering temperature, namely, around 1450° C., to obtain a porous core layer.

The porous core layer is then impregnated at room temperature with an aqueous suspension containing nanoparticles co-doped with alumina ($Al_2O_3$) and erbium (Er), in the same manner as in the first embodiment.

The impregnation solution is removed from the porous layer after a certain period of time (e.g., about 10 hours) and the resulting doped porous layer is dried (e.g., at room temperature under argon flux).

In exemplary embodiments, the doped porous layer is then calcined at a temperature of up to 1200° C. for at least 1 hour. This sub-step is particularly advantageous because it strengthens the nanoparticle structure before the collapsing step. This calcination step makes it possible to keep the nanoparticle structure in the preform after collapsing.

The doped porous layer is then sintered at a temperature above 1700° C.

Next, the preform is collapsed at 2200° C. to obtain the primary doped preform in the form of a first preform rod.

The external tube (i.e., the tube that is used as a starting point for the inside deposition step 50) is then removed (e.g., by chemical etching). For example, the preform may be treated in a bath of hydrofluoric acid (HF, which has the ability to dissolve glass) at room temperature to obtain the doped core with a minimal external silica clad layer.

The cladding part that is described in step 50 is not removed by this step. Only the external tube used to support the glass layers deposited within its interior (e.g., by MCVD) is removed. This removal may be carried out when the external tube does not have satisfactory optical purity.

Figure 5:
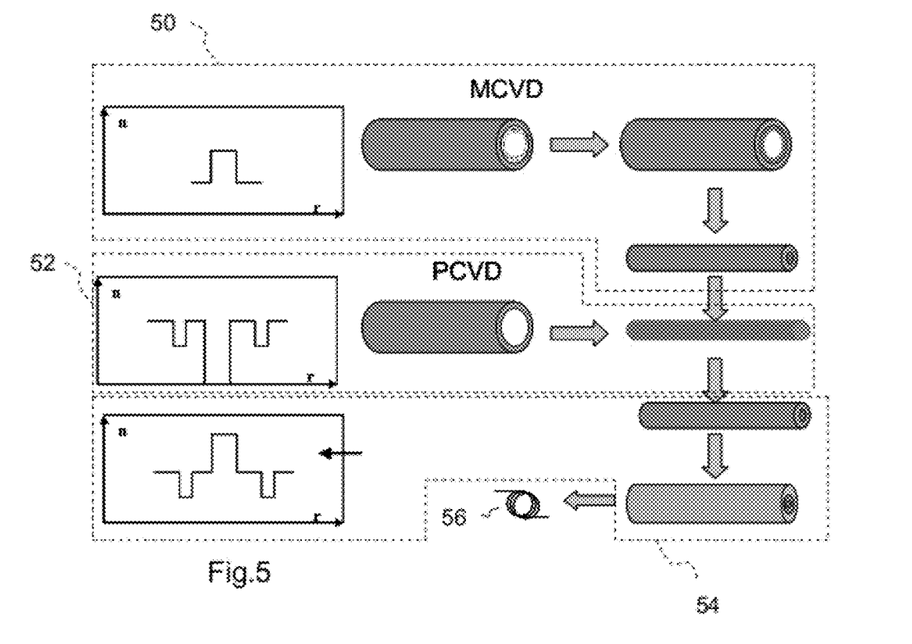
FIG. 5 schematically depicts another exemplary embodiment of a method of manufacturing an optical fiber in accordance with the present invention.

FIG. 5 shows the general look of the refractive index profile at the end of step 50 (i.e., making the first doped preform rod).

Next, step 52 includes manufacturing, separately from step 50, a second preform tube that includes the inner cladding, the depressed trench, and the outer cladding of the optical fiber with the same refractive index profile as in the first embodiment, by using a PCVD process according to a controlled gas delivery program.

Successive glass layers are deposited on the inner surface (i.e., the interior surface) of a glass tube at a temperature above 1700° C. The composition of the glass layers is determined according to the targeted refractive index profile.

For example, the first layers may be made of silica ($SiO_2$). The first layers may also be doped with germanium in the form of $GeO_2$ to increase the reference level of the preform refractive index.

The depressed trench deposition is achieved at specified preform radial positions by incorporating defined quantities of fluorine. This will decrease the refractive index. To achieve a refractive index difference $\Delta n_3$ of $-7.00 \times 10^{-3}$, as in exemplary optical fiber 1 in Tables 2A and 2B, about 2.5 weight percent of fluorine should be incorporated.

The last layers of the cladding (e.g., the inner cladding layers) are made in the same or similar conditions as the first layers.

FIG. 5 also shows the general look of the refractive index profile at the end of the second preform tube making step 52.

The following step 54 includes assembling the second depressed clad tube (i.e., the second preform tube) obtained at the end of step 52 around the first doped core rod obtained at the end of step 50.

The glass structures are typically assembled and fused at a temperature above 2000° C. to obtain a second doped preform rod.

The second doped preform rod may be overcladded or sleeved, in the same manner as in the first exemplary embodiment, to ensure single-mode propagation of the signal and to obtain a sleeved or overcladded preform.

The last step 56 includes drawing the optionally sleeved or overcladded preform into an optical fiber exhibiting the same characteristics as in the first embodiment.

As noted, optical fibers may be manufactured by drawing from final preforms.

A final preform may be manufactured by providing a primary preform (e.g., a preform rod) with an outer overcladding layer (i.e., an overcladding process). The outer overcladding layer typically consists of doped or undoped, natural or synthetic, silica glass. Several methods are available for providing the outer overcladding layer.

In a first exemplary method, a primary preform (e.g., a preform rod) may be overcladded using a silica sleeve tube, which may or may not be doped. This sleeve tube may then be collapsed onto the primary preform.

In another exemplary method, the outer overcladding layer may be provided by depositing and vitrifying natural or synthetic silica particles on the outer periphery of the primary preform (e.g., a preform rod) under the influence of heat. Such a process is known, for example, from U.S. Pat. Nos. 5,522,007, 5,194,714, 6,269,663, and 6,202,447, each of which is hereby incorporated by reference in its entirety.

In yet another exemplary method, an overcladding layer may be applied via an Outside Vapor Deposition (OVD) method. Here, a soot layer is first deposited on the outer periphery of a primary preform (e.g., a preform rod), and then the soot layer is vitrified to form glass.

As noted previously, primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD). By way of example, primary preforms may be manufactured using a PCVD process, which can precisely control the central core's refractive index profile. Alternatively, primary preforms may be manufactured via outside vapor deposition techniques, such as Outside Vapor Deposition (OVD) and Vapor Axial Deposition (VAD).

As noted, a depressed trench may be deposited on the inner surface of a substrate tube as part of the chemical vapor deposition process. Alternatively, a depressed trench may be manufactured either (i) by using a fluorine-doped substrate tube as the starting point of the internal deposition process for deposition of the refractive index central core or (ii) by sleeving a fluorine-doped silica tube over the refractive index central core, which itself may be produced using an outside deposition process (e.g., OVD or VAD). Accordingly, a component glass fiber manufactured from the resulting preform may have a depressed trench located at the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Pat. No. 7,995,888 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burov et al.); U.S. Pat. No. 8,009,950 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Application Publication No. US2011/0116160 A1 for a Rare-Earth-Doped Optical Fiber Having Small Numerical Aperture, filed Nov. 11, 2010, (Boivin et al.); U.S. Patent Application Publication No. US2011/0123161 A1 for a High-Bandwidth, Multimode Optical Fiber with Reduced Cladding Effect, filed Nov. 24, 2010, (Molin et al.); U.S. Patent Application Publication No. US2011/0123162 A1 for a High-Bandwidth, Dual-Trench-Assisted Multimode Optical Fiber, filed Nov. 24, 2010, (Molin et al.); U.S. Patent Application Publication No. US2011/0135262 A1 for a Multimode Optical Fiber with Low Bending Losses and Reduced Cladding Effect, filed Dec. 3, 2010, (Molin et al.); U.S. Patent Application Publication No. US2011/0135263 A1 for a High-Bandwidth Multimode Optical Fiber Having Reduced Bending Losses, filed Dec. 3, 2010, (Molin et al.); U.S. Patent Application Publication No. US2011/0188826 A1 for a Non-Zero Dispersion Shifted Optical Fiber Having a Large Effective Area, filed Jan. 31, 2011, (Sillard et al.); U.S. Patent Application Publication No. US2011/0188823 A1 for a Non-Zero Dispersion Shifted Optical Fiber Having a Short Cutoff Wavelength, filed Jan. 31, 2011, (Sillard et al.); U.S. Patent Application Publication No. 2011/0217012 A1 for a Broad-Bandwidth Multimode Optical Fiber Having Reduced Bending Losses, filed Mar. 1, 2011, (Bigot-Astruc et al.); U.S. Patent Application Publication No. 2011/0229101 A1 for a Single-Mode Optical Fiber, filed Mar. 15, 2011, (de Montmorillon et al.); U.S. patent application Ser. No. 13/175,181 for a Single-Mode Optical Fiber, filed Jul. 1, 2011, (Bigot-Astruc et al.); U.S. patent application Ser. No. 13/206,943 for a Method of Fabricating an Optical Fiber Preform, filed Aug. 10, 2011, (de Montmorillon et al.); U.S. patent application Ser. No. 13/275,921 for a Multimode Optical Fiber Insensitive to Bending Losses, filed Oct. 18, 2011, (Molin et al.); U.S. patent application Ser. No. 13/303,967 for a Radiation-Insensitive Optical Fiber Doped with Rare Earths, filed Nov. 23, 2011, (Burov et al.); and U.S. patent application Ser. No. 13/315,712 for a Rare-Earth-Doped Optical Fiber, filed Dec. 9, 2011, (Boivin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/

0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber prop Cables for MDU Deployments, filed Nov. 9, 2009, (Overton); U.S. Pat. No. 8,041,167 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Pat. No. 8,041,168 for Reduced-Diameter Ribbon Cables with High-Performance Optical Fiber, filed Nov. 10, 2009, (Overton); U.S. Pat. No. 8,031,997 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Application Publication No. 2011/0069932 A1 for a High-Fiber-Density Optical-Fiber Cable, filed Oct. 19, 2010, (Overton et al.); U.S. Patent Application Publication No. 2011/0091171 A1 for an Optical-Fiber Cable Having High Fiber Count and High Fiber Density, filed Oct. 19, 2010, (Tatat et al.); U.S. Patent Application Publication No. 2011/0176782 A1 for a Water-Soluble Water-Blocking Element, filed Jan. 19, 2011, (Parris); U.S. Patent Application Publication No. 2011/0268400 A1 for a Data-Center Cable, filed Apr. 28, 2011, (Louie et al.); U.S. Patent Application Publication No. 2011/0268398 A1 for a Bundled Fiber Optic Cables, filed May 3, 2011, (Quinn et al.); U.S. Patent Application Publication No. 2011/0287195 A1 for a Curing Apparatus Employing Angled UVLEDs, filed May 19, 2011, (Molin); U.S. Patent Application Publication No. 2012/0009358 for a Curing Apparatus Having UV Sources That Emit Differing Ranges of UV Radiation, filed Jun. 3, 2011, (Gharbi et al.); U.S. Patent Application Publication No. 2012/0014652 A1 for a Adhesively Coupled Optical Fibers and Enclosing Tape, filed Jul. 13, 2011, (Parris); U.S. patent application Ser. No. 13/206,601 for a Method and Apparatus Providing Increased UVLED Intensity, filed Aug. 10, 2011, (Overton); U.S. patent application Ser. No. 13/222,329 for an Optical-Fiber Module Having Improved Accessibility, filed Aug. 31, 2011, (Tatat); U.S. patent application Ser. No. 13/362,357 for a Broad-Bandwidth Optical Fiber, filed Jan. 31, 2012, (Molin et al.); U.S. patent application Ser. No. 13/362,395 for a Multimode Optical Fiber, filed Jan. 31, 2012, (Molin et al.); and U.S. patent application Ser. No. 13/401,026 for a Optical-Fiber Interconnect Cable, filed Feb. 21, 2012, (Risch et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An amplifying optical fiber, comprising:
    an inner core surrounded by an outer cladding, said inner core having an outer radius $r_1$ of between about 2.5 microns and 3.1 microns and a refractive index difference $\Delta n_1$ with respect to said outer cladding of between about $8.0 \times 10^{-3}$ and $10.5 \times 10^{-3}$, and comprising a silica-based main matrix and one or more rare earth elements;
    an inner cladding positioned between said inner core and said outer cladding, said inner cladding having an outer radius $r_2$ of between about 4.1 microns and 15.8 microns and a refractive index difference $\Delta n_2$ with respect to said outer cladding; and
    a depressed trench positioned between said inner cladding and said outer cladding, said depressed trench having an outer radius $r_3$, a negative refractive index difference $\Delta n_3$ with respect to said outer cladding of between about $-14.2 \times 10^{-3}$ and $-3.7 \times 10^{-3}$, and a volume integral $V_{13}$ defined as $$V_{13} = 2 \cdot \int_{r_2}^{r_3} \Delta n(r) \cdot r \, dr \approx (r_3^2 - r_2^2) \times \Delta n_3,$$

of between about $-2200 \times 10^{-3} \, \mu m^2$ and $-1600 \times 10^{-3} \, \mu m^2$;
    wherein the difference $r_2 - r_1$ between said inner cladding's outer radius $r_2$ and said inner core's outer radius $r_1$ is between about 1.4 microns and 12.9 microns; and
    wherein the difference $r_3 - r_2$ between said depressed trench's outer radius $r_3$ and said inner cladding's outer radius $r_2$ is between about 4.7 microns and 18.9 microns.

2. The optical fiber according to claim 1, wherein, at a wavelength of 1550 nanometers, the optical fiber has a numerical aperture of between about 0.16 and 0.18.

3. The optical fiber according to claim 1, wherein, at a wavelength of 1550 nanometers, the optical fiber has a numerical aperture of between about 0.16 and 0.17.

4. The optical fiber according to claim 1, wherein the optical fiber has a Mode Field Diameter (MFD) of about 8.0 microns or less.

5. The optical fiber according to claim 1, wherein, for a radius of curvature of 5 millimeters at a wavelength of 1550 nanometers, the optical fiber has bending losses of 0.01 dB/m or less.

6. The optical fiber according to claim 1, wherein said inner core comprises a doping element that reduces the refractive index of silica.

7. The optical fiber according to claim 1, wherein said inner core comprises fluorine.

8. The optical fiber according to claim 1, wherein said inner core comprises nanoparticles including said one or more rare earth elements.

9. The optical fiber according to claim 1, wherein said inner core comprises one or more rare earth elements from chloride salt precursors.

10. The optical fiber according to claim 1, wherein said one or more rare earth elements comprise erbium, ytterbium, and/or thulium.

11. The optical fiber according to claim 1, wherein, within said inner core, the concentration of said one or more rare earth elements is between about 0.01 weight percent and 0.5 weight percent.

12. The optical fiber according to claim 1, wherein, within said inner core, the concentration of said one or more rare earth elements is between about 0.01 weight percent and 0.2 weight percent.

13. The optical fiber according to claim 1, wherein said inner core comprises germanium, phosphorus, and/or aluminum.

14. The optical fiber according to claim 1, wherein said inner cladding's refractive index difference $\Delta n_2$ is between about $-1.0 \times 10^{-3}$ and $1 \times 10^{-3}$.

15. The optical fiber according to claim 1, wherein said inner cladding's refractive index difference $\Delta n_2$ is between about $-0.5 \times 10^{-3}$ and $0.5 \times 10^{-3}$.

16. The optical fiber according to claim 1, wherein said inner cladding's refractive index difference $\Delta n_2$ is substantially zero.

17. The optical fiber according to claim 1, wherein the optical fiber's cut-off wavelength is less than 1500 nanometers.

18. An optical-fiber laser comprising the optical fiber according to claim 1.

19. An optical-fiber amplifier comprising the optical fiber according to claim 1 and having a pump power greater than 500 mW.

* * * * *